(12) United States Patent
Seok

(10) Patent No.: US 8,792,343 B2
(45) Date of Patent: *Jul. 29, 2014

(54) PROCEDURE FOR WIRELESS NETWORK MANAGEMENT AND STATION SUPPORTING THE PROCEDURE

(75) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 305 days.

This patent is subject to a terminal disclaimer.

(21) Appl. No.: 13/441,685

(22) Filed: Apr. 6, 2012

(65) Prior Publication Data

US 2012/0195300 A1 Aug. 2, 2012

Related U.S. Application Data

(63) Continuation of application No. 12/209,111, filed on Sep. 11, 2008, now Pat. No. 8,174,973.

(30) Foreign Application Priority Data

Sep. 12, 2007 (KR) .................. 10-2007-0092750

(51) Int. Cl.
*H04L 12/26* (2006.01)
*H04L 12/56* (2006.01)

(52) U.S. Cl.
CPC ............. *H04L 47/10* (2013.01); *H04L 47/22* (2013.01); *H04L 47/2441* (2013.01)
USPC ........... 370/230; 370/235; 709/220; 709/221; 709/222

(58) Field of Classification Search
CPC ..... H04L 47/10; H04L 12/5695; H04L 47/22; H04L 47/2408; H04L 47/2433; H04L 47/2441

USPC .......... 370/230, 235, 328–338; 709/220–222, 709/227–235

See application file for complete search history.

(56) References Cited

U.S. PATENT DOCUMENTS

| | | | |
|---|---|---|---|
| 6,226,523 B1 | 5/2001 | Karlsson et al. | |
| 2003/0027526 A1 | 2/2003 | Hillyard | |
| 2004/0111519 A1* | 6/2004 | Fu et al. | 709/229 |
| 2004/0235453 A1* | 11/2004 | Chen et al. | 455/410 |
| 2006/0095968 A1 | 5/2006 | Portolani et al. | |

FOREIGN PATENT DOCUMENTS

| | | |
|---|---|---|
| KR | 1020070029437 | 3/2007 |
| KR | 1020070041575 | 4/2007 |
| KR | 10-2007-0064427 | 6/2007 |

* cited by examiner

*Primary Examiner* — Mark Rinehart
*Assistant Examiner* — Mang Yeung
(74) *Attorney, Agent, or Firm* — Lee, Hong, Degerman, Kang & Waimey

(57) ABSTRACT

There is provided a procedure for wireless network management and a station supporting the procedure. In the procedure, non-AP station which wants to us a traffic filter service (TFS) transmits a TFS request message including one or more TFS request elements for defining information about the requesting traffic filters to an access point (AP). And, the non-AP station receives, from the AP in response to the first TFS request message, a TFS response message including one or more TFS response elements for defining information about the status of the requesting traffic filters.

10 Claims, 13 Drawing Sheets

FIG. 9

| TFS Response Status (243a) | TFS ID (243b) |
|---|---|
| 1 | 1 |

Octets:

FIG. 11

| Category (410) | Action (420) | Dialog Token (430) | Filter Interval (440) | TFS Request Element (450) | Vendor Specific Elements (460) |
|---|---|---|---|---|---|
| 1 | 1 | 1 | 4 | Variable | Variable |

Octets:

PROCEDURE FOR WIRELESS NETWORK MANAGEMENT AND STATION SUPPORTING THE PROCEDURE

CROSS-REFERENCE TO RELATED PATENT APPLICATIONS

This application is a continuation of U.S. application Ser. No. 12/209,111, filed Sep. 11, 2008, now U.S. Pat. No. 8,174,973, which claims the benefit of earlier filing date and right of priority to Korean Patent Application No. 10-2007-0092750, filed on Sep. 12, 2007, the contents of all of which are hereby incorporated herein by reference in their entireties.

BACKGROUND

1. Field of the Invention

The present invention relates to a wireless local access network (WLAN), and more particularly, to a WLAN management procedure and a station supporting the management procedure.

2. Description of the Related Art

With the development of information communication technology, a variety of wireless communication technologies have been introduced. A WLAN is technology permitting wireless access to Internet in specific service areas such as houses, companies, or air planes by the use of portable terminals such as a personal digital assistant (PDA), a laptop computer, and a portable multimedia player (PMP) on the basis of a radio frequency technology.

These days, thanks to the increased availability of WLANs, portable terminal users such as laptop computer users are able to perform their tasks with increased mobility. For example, a user can take his laptop computer from his desk into a conference room to attend a meeting and still have access to his local network to retrieve data and have access to the Internet via one or more modems or gateways present on the local network without being tethered by a wired connection. Similarly, business travelers commonly use their portable terminals to gain access to their email accounts, to check if there is any unread email, and to read and send email.

In the initial WLAN technology, a data rate of 1 to 2 Mbps was supported by the use of frequency hopping, spread spectrum, and infrared communication using a frequency of 2.4 GHz in accordance with the IEEE 802.11. In recent years, with the development of the wireless communication technology, 54 Mbps in maximum can be supported by applying the orthogonal frequency division multiplex (OFDM) technology, etc. to the WLAN. In addition, the IEEE 802.11 has developed or is developing wireless communication technologies for improvement in quality of service (QoS), compatibility of an access point (AP) protocol, security enhancement, radio measurement or radio resource measurement, wireless access in vehicular environment, fast roaming, mesh network, inter-working with external networks, wireless network management, and the like.

The wireless network management procedure for a WLAN provides protocols relevant to the wireless network management, such as allowing a non-AP station or an access point (AP) to collect a variety of information on the wireless network or diagnosing problems of the wireless network. The wireless network management procedure includes an event reporting procedure, a diagnostic reporting procedure, a presence service procedure, a base service set (BSS) transition management procedure, a flexible broadcast multicast service (FBMS) procedure, and a sleep mode procedure. A traffic filter service (TFS) procedure is also included in the wireless network management procedure.

The TFS is a service which an access point (AP) provides to a non-AP station (STA) associated therewith. The AP does not transmit all incoming frames to the associated non-AP STA, but transmits only a frame corresponding to a predetermined condition. In general, since an AP should transmit all frames to a receiving non-AP STA but can transmit only a frame corresponding to a filtering condition in the TFS, it is possible to prevent unnecessary traffics from occurring, thereby enhancing the efficiency in using radio resources. In addition, since a non-AP STA receives and processes only frames necessary therefor, it is possible to reduce the power consumption.

SUMMARY OF THE INVENTION

The TFS employs a sender-side traffic filter scheme. That is, an AP relaying a frame for a non-AP STA determines whether a frame to be transmitted is matched with a filtering condition set by the non-AP STA, and then transmits the frame only when it is determined that the frame is matched with the filtering condition. Accordingly, in the sender-side traffic filter scheme, the non-AP STA intending to use the TFS should transmit the filtering condition to the AP in advance to set the filtering condition in the AP. The TFS procedure for setting the filtering condition in the AP is an incident procedure inevitable for using the TFS with the sender-side traffic filtering scheme and thus should be preferably performed efficiently.

Accordingly, a technical goal of the invention is to provide a TFS procedure allowing a non-AP STA to efficiently set a filtering condition.

On the other hand, in the TFS, when a received frame is matched with a traffic filter which is a preset filtering condition, the AP can transmit the frame to the non-AP STA using two methods. In the first method, an AP transmits a frame matched with a traffic filter to a relevant non-AP STA, as soon as receiving the frame. In the second method, the AP does not transmit the received frame to the non-AP STA at once, and first notifies to the non-AP STA only the fact that the frame matched with the traffic filter has been received and transmits the received frame later.

By using the second method, a problem may be caused. More specifically, when the AP continuously receives frames matched with the set traffic filter, the AP should notify the fact to the non-AP STA, whereby the signaling excessively increases for a short time.

Accordingly, another technical goal of the invention is to provide a TFS procedure that can solve the problem that an AP should excessively transmit messages used to notify a non-AP STA requesting for a TFS of the fact that a frame matched with a traffic filter has been received for a short time in the TFS and that can set an interval at which the fact that the frame matched with the traffic filter has been received is notified depending on the intention of the non-AP ATS requesting for the TFS.

According to an aspect of the present invention, there is provided a procedure for wireless network management, the procedure comprising: transmitting the first traffic filter service (TFS) request message including one or more TFS request elements for defining information about the requesting traffic filters to an access point (AP); and receiving, from the AP in response to the first TFS request message, the first TFS response message including one or more TFS response elements for defining information about the status of the requesting traffic filters.

According to another aspect of the present invention, there is provided a procedure for wireless network management, the procedure comprising: receiving the first traffic filter service (TFS) request message including one or more TFS request elements for defining information about the requested traffic filters from a Non-AP station; and transmitting, to the non-AP station in response to the first TFS request message, the first TFS response message including one or more TFS response elements for defining information about the status of the requested traffic filters.

According to another aspect of the present invention, there is provided a station for traffic filter service (TFS) in a wireless network, the station comprising: a processor configured to generate and process frames; and a transceiver operably connected to the processor and configured to transmit and receive the frames for the processor, wherein the processor is configured to generate the first traffic filter service (TFS) request frame including one or more TFS request elements for defining information about the requesting traffic filters to an access point (AP) and forward the generated first TFS request frame to the transceiver, wherein the transceiver transmits the first TFS request frame to an access point (AP) and receives, from the AP in response to the first TFS request frame, the first TFS response message including one or more TFS response elements for defining information about the status of the requesting traffic filters.

BRIEF DESCRIPTION OF THE DRAWINGS

FIG. 9 is a diagram illustrating a format of a TFS state sub-element subfield of the TFS response element field shown in FIG. 8.

FIG. 11 is a diagram illustrating a format of a TFS request frame that can be used in a second embodiment of the invention.

DESCRIPTION OF THE EXEMPLARY EMBODIMENTS

Hereinafter, a procedure for wireless network management and a station supporting the procedure according to exemplary embodiments of the present invention will be described in detail with reference to the accompanying drawings. In the following embodiments, a wireless LAN (WLAN) system is described as a wireless communication system, but this is only exemplary. Accordingly, the embodiments to be described below can be applied to wireless communication systems other than the WLAN system, as long as they can be permitted in nature. In this case, terms or words specific to the WLAN system used in the embodiments can be properly modified into terms or words customarily used in the corresponding wireless communication system.

Figure 1:
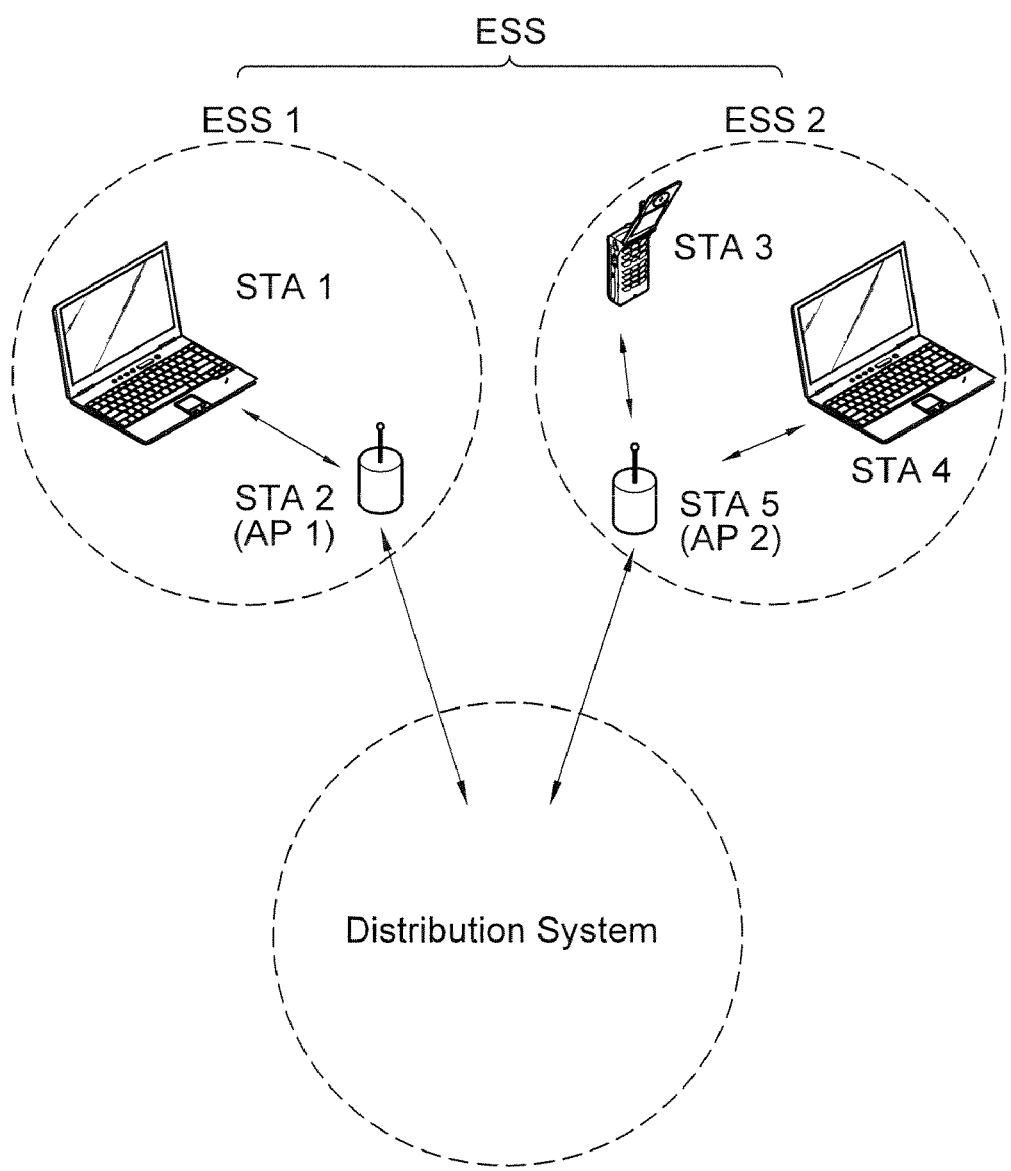
FIG. 1 is a block diagram illustrating a configuration of an infrastructure basic service set as an example of a wireless LAN system.

FIG. 1 schematically shows configurations of examples of a WLAN system to which the embodiments of the present invention can be applied.

As shown in FIG. 1, a WLAN system includes one or more basic service sets (BSS). The BSS is a set of stations (STAs) which can be successfully synchronized and communicate with each other, but is not a concept indicating a specific area. The BSS can be classified into an infrastructure BSS and an independent BSS (IBSS). The former is shown in FIG. 1. The infrastructure BSSs BSS1 and BSS2 include one or more Non-AP STAs STA1, STA2, STA3, and STA4, an access point (AP) which is a STA providing a distribution service, and a distribution system (DS) connecting plural APs AP1 and AP2. A Traffic Filter Service (TFS) is a service that may be provided by an AP to its associated STAs, where the AP examines incoming MSDUs and management frames destined for a STA.

A STA is a functional unit including a medium access control (MAC) interface and a physical layer interface for a wireless medium in accordance with the IEEE 802.11 standard and includes both APs and non-AP stations in a wide meaning. A station for wireless communication includes a processor and a transceiver and further includes a user interface and a display unit. The processor is a functional unit designed to generate a frame to be transmitted through a wireless network or to process a frame received through the wireless network and serves to perform a variety of functions of controlling the station. The transceiver is operably connected to the processor and is a unit designed to transmit and receive frames through a wireless network.

A portable terminal operated by a user is a non-AP STA (STA1, STA3, and STA4). Simply, a STA may mean a non-AP STA. The non-AP STA may be called a wireless transmitting/receiving unit (WTRU), a user equipment (UE), a mobile station (MS), a portable terminal, or a mobile subscriber unit.

The AP (AP1 and AP2) is a functional entity providing connection to the DS through a wireless medium for the associated stations. A communication between the non-AP STAs in the infrastructure BSS including an AP is made through the AP in principle, but the non-AP STAs may communicate directly with each other when a direct link is set up therebetween. The AP may be called a convergence controller, a base station (BS), a node-B, a base transceiver system (BTS), or a site controller, in addition to the tile of an access point.

Plural infrastructure BSSs can be connected to each other through the DS. The plural BSSs connected through the DS are called an extended service set (ESS). The STAs in the ESS can communicate with each other and the non-AP STAs can move from one BSS to another BSS while communicating without any interception.

The DS is a mechanism for allowing an AP to communicate with another AP. Accordingly, the AP can transmit a frame for the STAs associated with the BSS managed by the AP, forward a frame when a STA moves to another BSS, or forward a frame to an external network such as a wired network. The DS may not be a network necessarily, and is not limited in type as long as it can provide a predetermined distribution service defined in the IEEE 802.11 standard. For example, the DS may be a wireless network such as a mesh network or a physical structure for connecting the APs to each other.

Figure 2:
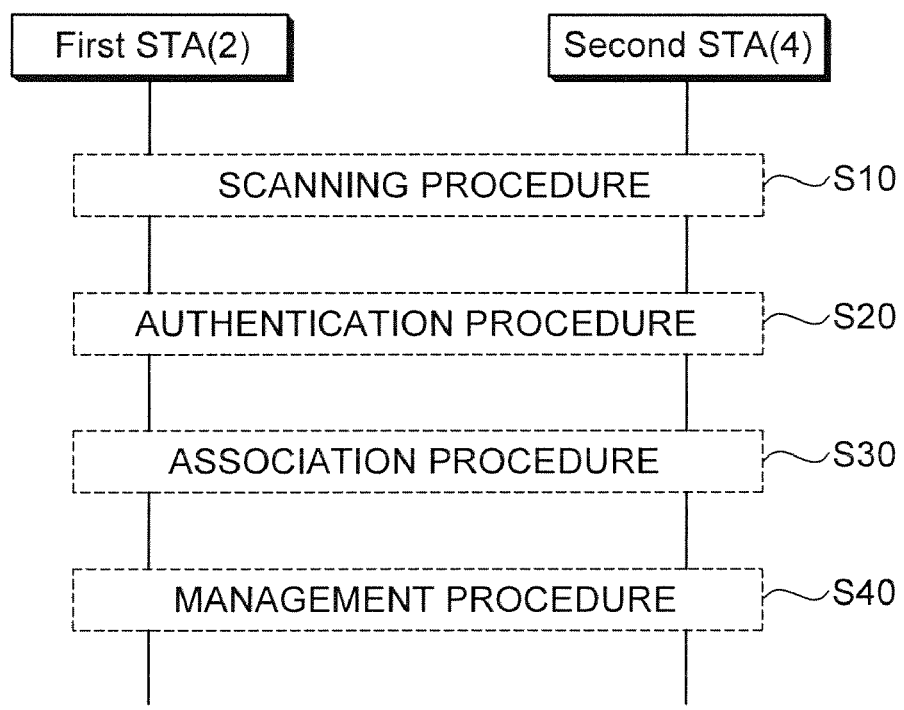
FIG. 2 is a flowchart illustrating a management procedure of a wireless network in a wireless communication system according to an embodiment of the invention.

FIG. 2 is a flowchart illustrating a management procedure of a wireless network in a wireless LAN system shown in FIG. 1 or in a wireless communication system including the wireless LAN system or equivalent thereto according to an embodiment of the invention. The flowchart of operations between the first STA 2 and the second STA 4 shown in FIG. 2 can show a procedure performed between a non-AP STA and an AP constituting an infrastructure BSS.

Referring to FIG. 2, a radio measurement procedure in a wireless communication system according to the embodiment of the invention further includes as preliminary procedures a scanning procedure (S10), an authentication procedure (S20), and an association procedure (S30). The radio measurement procedure further includes a management procedure (S40) which is performed after the preliminary procedures S10 to S30. According to the embodiment of the invention, some procedures of the preliminary procedures may not be essential but arbitrary.

Referring to FIG. 2, the scanning procedure S10 is first performed between the first STA 2, which is a non-AP STA and the second STA 4, which is an AP. The scanning procedure S10 is a procedure for allowing the non-AP STA 2 to search for a candidate station to be associated with in the association procedure S30, for example, a procedure for allowing a non-AP STA to search for an AP in the infrastructure BSS.

The scanning procedure can be classified into two types. One is a passive scanning method using a beacon frame transmitted from APs including the second STA 4. In this method, the Non-AP STA 2 to access a wireless LAN can search for an accessible BSS by receiving a beacon frame periodically transmitted from the second STA 4. The second STA 4 supporting a TFS may include the Extended Capabilities element set to 1 in a transmitted beacon frame to indicate this support.

The other is an active scanning method. In this method, the first STA 2 to access a wireless LAN system first transmits a probe request frame. The STA 2 supporting a TFS may include the Extended Capabilities element set to 1 in the probe request frame to indicate this support. The second STA 4 having received the probe request frame transmits a probe response frame including a service set ID (SSID) of the BSS managed by the AP and information on capabilities supported by the AP. And, the second STA 4 supporting a TFS may also include the Extended Capabilities element set to 1 in the probe response frame to indicate this support. Accordingly, the first STA 2 can know existence of a candidate AP and a variety of information on the candidate AP from the received probe response frame.

Referring to FIG. 2, the authentication procedure S20 is performed between the first STA 2 and the second STA 4. The authentication procedure S20 is a procedure for negotiating an authentication process and an encoding method between entities participating in a wireless communication. For example, the first STA 2 can perform the authentication procedure S20 to be associated with one or more APs, which had searched for in the scanning procedure S10. In the WLAN, since an open system authentication method is used in most cases, the second STA 4 performs the authentication process without any condition in response to the authentication request from the first STA 2. Reinforced authentication methods include EAP-TLS (Extensible Authentication Protocol-Transport Layer Security), EAP-TTLS (Extensible Authentication Protocol-Tunneled Transport Layer Security), EAP-FAST (Extensible Authentication Protocol-Flexible Authentication via Secure Tunneling), and PEAP (Protected Extensible Authentication Protocol) based on the IEEE 802.1x standard.

When the authentication process is successfully completed in the authentication procedure 820, the first STA performs the association procedure S30. The association procedure S30 may be an arbitrary procedure which is performed when the first STA 2 is a non-AP STA and the second STA 4 is an AP. The association procedure S30 is to set up an identifiable link, that is, a wireless link, between the first STA 2 and the second STA 4. In the association procedure S30, the first STA 2 transmits an association request frame to the second STA 4 having successfully completed the authentication procedure 520. The first STA 2 supporting a TFS may also include the Extended Capabilities element set to 1 in the association request frame to indicate this support. And the second STA 4 transmits to the first STA 2 an association response frame having a state value of "successful" in response to the association request frame. The association response frame includes an identifier for identifying the association with the first STA 2, for example, an association ID (AID). And, the association response frame may further include the Extended Capabilities element set to 1.

When the association procedure S30 has been successfully completed but the connection state between the first STA 2 and the second STA 4 may be deteriorated due to a variable channel condition, the first STA 2 can perform the association procedure with another accessible AP again, which is called a re-association procedure. The re-association procedure is very similar to the above-mentioned association procedure S30. More specifically, in the re-association procedure, the first STA 2 transmits a re-association request frame to a different AP (an AP having successfully completed the authentication procedure S20 among the candidate APs searched for in the scanning procedure S10) other than the AP currently associated therewith, and the different AP transmits a re-association response frame to the first STA 2. Both the re-association request frame and the re-association frame may include the Extended Capabilities element set to 1. And, the re-association request frame further includes information on the AP previously associated therewith and the re-associated AP can transmit data buffered in the second STA 4, which is an existing AP, using the information.

Referring to FIG. 2, the management procedure (S40) is performed between the first STA 2 and the second STA 4 having completed the authentication procedure S20 and/or the association procedure 530 in addition thereto. In this embodiment, the first STA 2 and the second STA 4 perform a traffic filter service (TFS) procedure as a kind of management procedure shown in step S40.

The TFS is not provided by all the BSSs, but is provided only when an AP and a non-AP STA both support the TFS. In this case, the AP and the non-AP STA supporting the TFS notify the fact to the opposite parties. For example, by setting a TFS bit of a wireless network management capability information element to or setting a TFS bit of an extended capability information element to "1", the AP and the non-AP STA supporting the TFS can notify the fact of supporting the TFS to the opposite parties. The information for notifying the supporting of the TFS can be included in the beacon frame, the association request frame, the association response frame, the re-association request frame, the re-association response frame, and the probe response frame, as described above.

Figure 3:
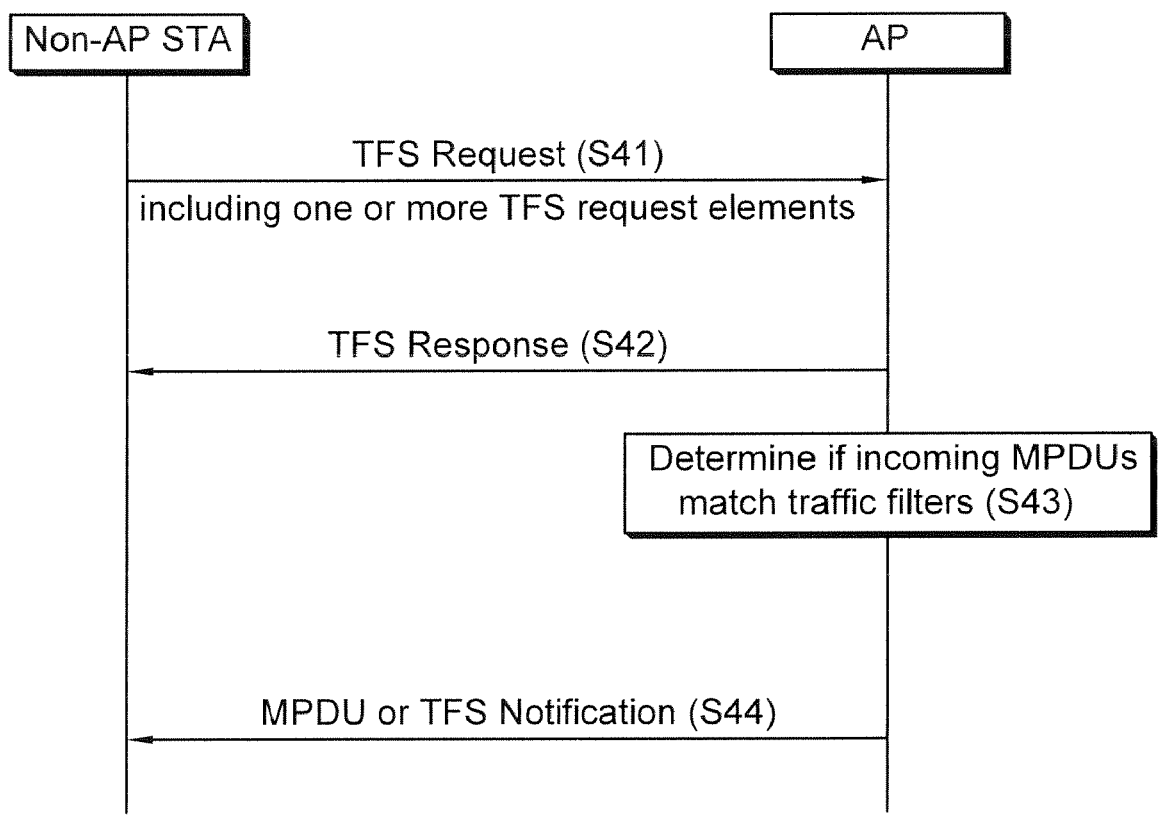
FIG. 3 is a diagram illustrating a flow of messages in a TFS procedure according to a first embodiment of the invention.

FIG. 3 is a diagram illustrating a flow of messages in the TFS procedure in a first embodiment of the invention.

Referring to FIG. 3, the non-AP STA requesting for a specific traffic filter transmits a TFS request message such as a TFS request frame to the AP (S41). The TFS request frame includes one or more TFS request elements. The TFS request element defines information about the traffic filters that are enabled at the AP for the requesting non-AP STA. In this embodiment, the TFS request message is not the TFS request frame, but may be a re-association request frame including one or more TFS request elements.

In this embodiment, by including plural TFS request elements, that is, plural TFS IDs, in one TFS request frame, the non-AP STA intending to use the TFS can define plural traffic filters to be set even when the TFS request frame is transmitted only once. Accordingly, in the wireless network management procedure according to this embodiment, it is possible to enhance the efficiency in using the radio resources in the TFS procedure, and the requesting non-AP STA need not transmit the TFS request frame several times even when the number of traffic filter sets to be set is one more.

Figure 4:
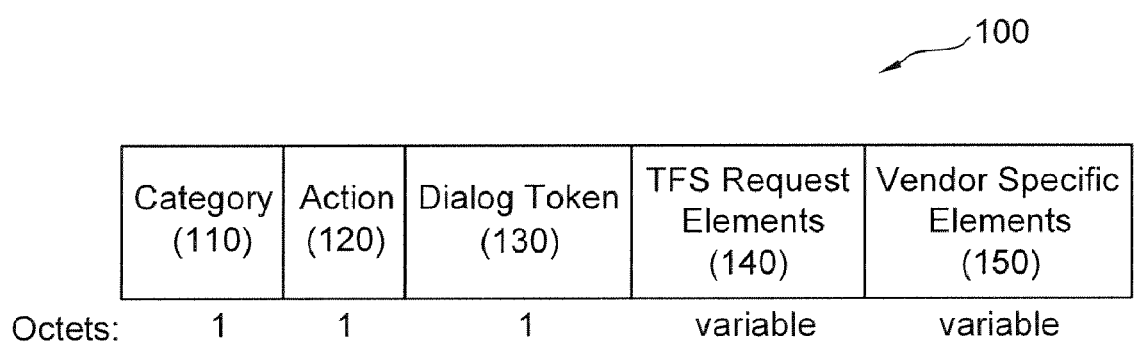
FIG. 4 is a diagram illustrating a format of a TFS request frame that can be used in the first embodiment of the invention.

FIG. 4 is a diagram illustrating a format of the TFS request frame that can be used in this embodiment. Referring to FIG. 4, the TFS request frame 100 includes a category field 110, an action field 120, a dialog token field 130, one or more TFS request element fields 140, and one or more vendor specific element fields 150.

The category field 110 is used to indicate the category of the TFS request frame 100 and can be set to a value indicating a wireless network management category. The action field 120 is used to identify the type of the frame and can be set to a value indicating the TFS request frame. The dialog token field 130 is set to a value selected by the non-AP STA transmitting the TFS request frame 100 so as to identify the transaction of the TFS request and the TFS response. The vendor specific element field 150 is an arbitrary field and includes one or more vendor specific elements as needed.

The TFS request element field 140 is used to specify one or more traffic filters requested for by the non-AP STA and serves to define information on the traffic filters that is enabled at the AP for the requesting non-AP STA. That is, the TFS request element field 140 serves to define conditions that are used for the non-AP STA intending to use the TFS to filter an incoming frame at the AP. That is, the AP determines whether the incoming frame (for example, a MSDU or a management frame) to be transmitted to the non-AP STA is matched with the set traffic filters, using the information defined in the TFS request element field 140 as the traffic filters.

Figure 5:
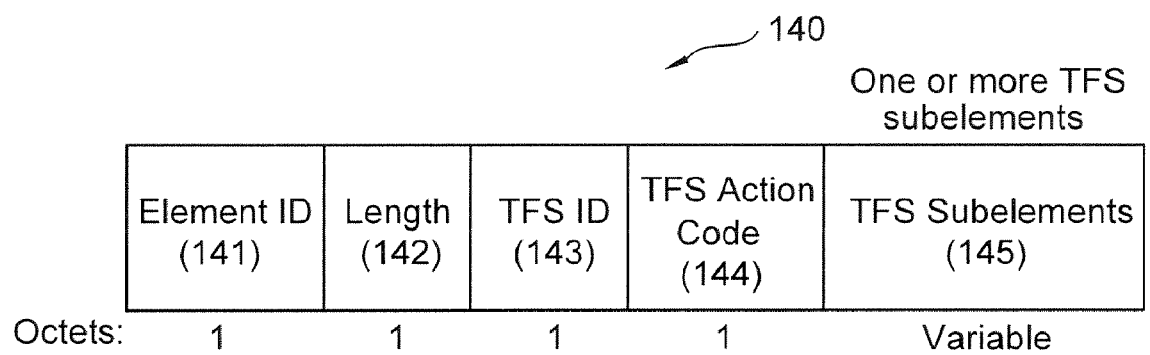
FIG. 5 is a diagram illustrating a format of a TFS request element field of the TFS request element shown in FIG. 4.

FIG. 5 is a diagram illustrating a format of the TFS request element field 140. Referring to FIG. 5, the TFS request element field 140 includes an element ID subfield 141, a length subfield 142, a TFS ID subfield 143, a TFS action code subfield 144, and one or more TFS sub-element subfields 145.

The element ID subfield 141 is set to a specific value for identifying the TFS request elements. The length subfield 142 can be set to a value of 3+n, where n indicates the total length of the TFS sub-element subfield 145 included in the TFS request element field 140. The TFS ID subfield 143 indicates a specific ID for a set of traffic filters specified in the TFS sub-element subfield 145. The TFS action code subfield 144 indicates predetermined information in the unit of bits, and defines an action taken by the AP when the incoming frame is matched with the traffic filter. The bits included in the subfield 144 can include "Delete" and "Notify." The bit of "Delete" can be used to indicate whether the relevant traffic filter should be deleted when a frame matched with the traffic filter is received. For example, if the bit of "Delete" is set to "1", it means that the traffic filter should be deleted when the frame matched with the traffic filter is received. When the bit is set to "0", it means that the traffic filter should not be deleted. The bit of "Notify" can be used to indicate whether a message, for example, a TFS notification frame, indicating the fact that a frame matched with the traffic filter is received should be transmitted. For example, when the bit of "Notify" is set to "1", it means that the fact is notified using the TFS notification frame. When the bit is set to "0", it means that the TFS notification frame is not transmitted.

The TFS sub-element subfield 145 includes one or more TFS sub-elements. The TFS sub-elements specify the set of traffic filters. Accordingly, when there are plural TFS sub-elements, the TFS sub-element subfield 145 specifies plural sets of traffic filters. To specify the traffic filters, one TFS sub-element includes, for example, one or more traffic classification (TCLAS) information elements and 0 or more TCLAS processing information element.

Figure 6:
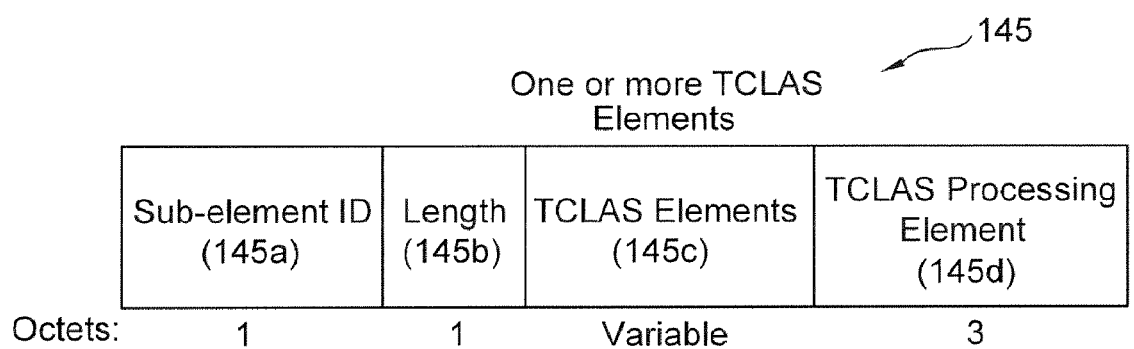
FIG. 6 is a diagram illustrating a format of a TFS sub-element of the TFS request element field shown in FIG. 5.

FIG. 6 is a diagram illustrating a format of the TFS sub-element 145. Referring to FIG. 6, the TFS sub-element 145 includes a sub-element ID unit 145a, a length unit 145b, and a TCLAS element unit 145c, and can further include a TCLAS processing information unit 145c. The sub-element ID unit 145a is set to a specific value indicating that the sub unit is the TFS sub-element. The length unit 145b is set to a value indicating the sum of the length of the TCLAS information unit 145c and the length of the TCLAS processing information unit 145b if any. The TCLAS information unit 145c includes one or more TCLAS information elements for specifying the traffic filters. The TCLAS processing information unit 145d is arbitrary, and defines how to process plural TCLAS information elements.

Referring to FIG. 3, when the TFS request parameters included in the received frame are valid, the AP having set one or more traffic filters for the requesting non-AP STA transmits a TFS response message, for example, a TFS response frame, in response to the received TFS request message (S42). When the TFS request message is a re-association request message including one or more TFS request elements, the TFS response message may be a re-association response message including one or more TFS response elements.

Figure 7:
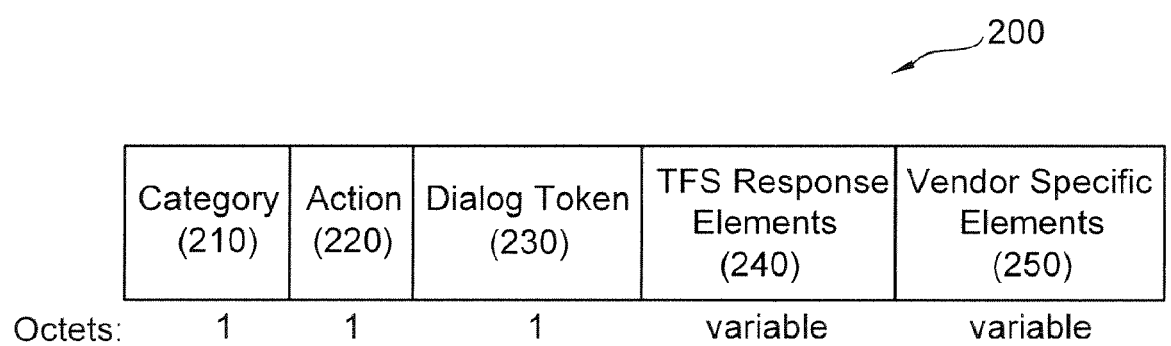
FIG. 7 is a diagram illustrating a format of a TFS response frame that can be used in the first embodiment of the invention.

FIG. 7 is a diagram illustrating a format of the TFS response frame. Referring to FIG. 7, the TFS response frame 200 includes a category field 210, an action field 220, a dialog token field 230, a TFS response element field 240, and a vendor specific element field 250.

The category field 210 is used to indicate the category of the TFS response frame 200 and can be set to a value indicating a wireless network management category. The action field 220 is used to identify the type of the frame and can be set to a value indicating the TFS request frame. The dialog token field 230 is set to the same value as set in the dialog token field 130 of the received TFS request frame 100. The vendor specific element field 250 is an arbitrary field and includes one or more vendor specific elements as needed.

Figure 8:
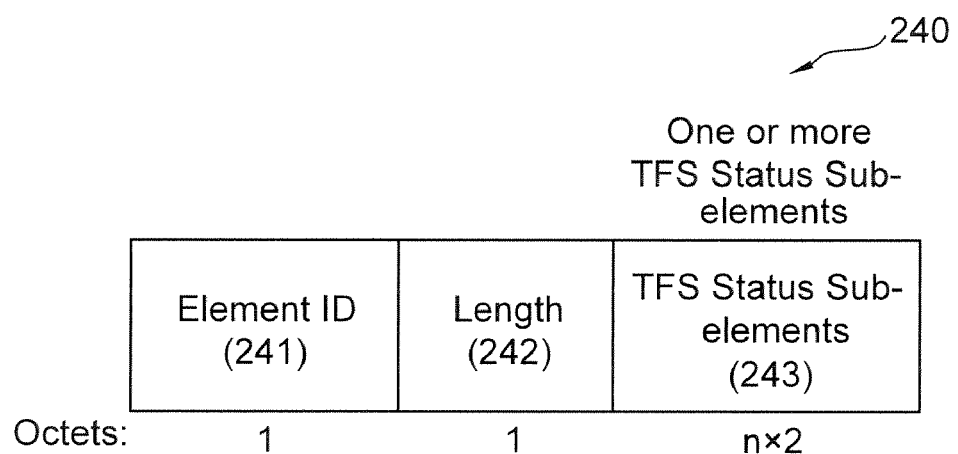
FIG. 8 is a diagram illustrating a format of a TFS response element field of the TFS response frame shown in FIG. 7.

The TFS response element field 240 is used to indicate the traffic filters designed to be supported by the AP and serves to define the states of one or more traffic filters requested for by the received TFS request frame 100. A format of the TFS response element field 240 is shown in FIG. 8 and includes an element ID subfield 241, a length subfield 242, and one or more TFS state sub-element subfields 243. The element ID subfield 241 is set to a value of 2×n, where n represents the total length of all the TFS state sub-element subfields 243 included in the TFS response element field 240.

The TFS state sub-element subfield 243 is used to define information on the states of the requested traffic filters and a format thereof is shown in FIG. 9. Referring to FIG. 9, the TFS state sub-element subfield 243 includes a TFS response state unit 243a and a TFS ID unit 243b. The TFS response state unit 243a can be set to a value indicating the acceptance of the requested traffic filters (the TFS traffic filters set specified in the TFS ID unit 243b) and the reason for rejection if it is rejected. An example of the information indicating the TFS response state is shown in Table 1.

TABLE 1

| Value | Description |
| --- | --- |
| 0 | Accept |
| 1 | Denied due to malformed request or an ambiguous classifier |
| 2 | Denied due to the lack of resources on AP |
| 3 | Denied due to requested filter(s) matching 2 or more existing enabled traffic filters |
| 4 | Denied. By policy, requested traffic filter is not permitted to participate in TFS |
| 5 | Overridden due to the policy limits on AP |
| 6 | Denied. The AP is unable to perform the requested action |
| 7 | Overridden due to an alternate or a duplicate traffic filter set on AP |
| 8-255 | Reserved |

Referring to FIG. 3, the AP inspects an incoming MSDU and a management frame having the non-AP STA as the destination thereof and determines whether the frame is matched with a specific set of traffic filters set in step S41 and S42 (S43). As the determination result, when the individually addressed frames are not matched with any set of traffic filters, the relevant frame is discarded. On the contrary, when the individually addressed frames are matched with at least one set of traffic filters, the relevant frame can be directly delivered to the non-AP STA or the TFS notification frame may be transmitted prior to the delivery of the relevant frame. For example, when the bit of "Notify" of the TFS action code subfield 144 of the TFS request element 140 shown in FIG. 5 is set to "1", the TFS notification frame is first transmitted. When the bit is set to "1", the relevant frame may be directly transmitted.

Figure 10:
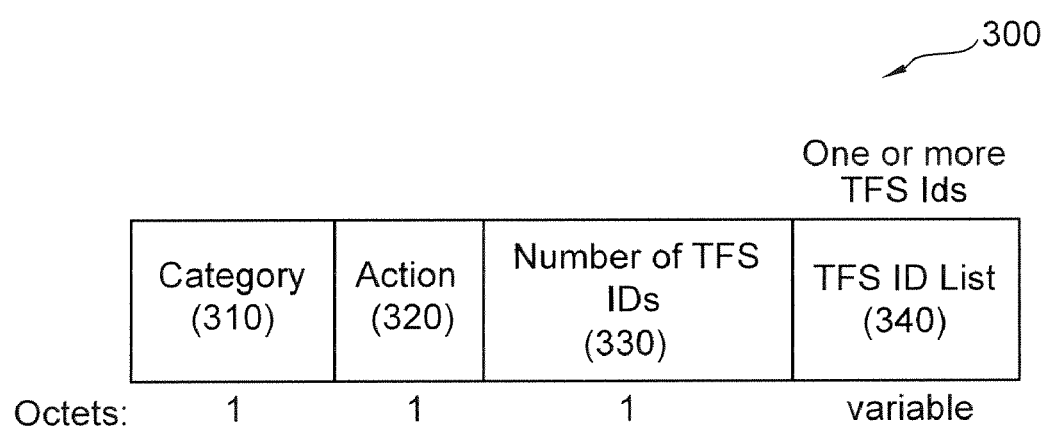
FIG. 10 is a diagram illustrating a format of a TFS notification frame that can be used in the first embodiment of the invention.

FIG. 10 is a diagram illustrating a format of the TFS notification frame according to an embodiment of the invention. Referring to FIG. 10, the TFS notification frame 300 includes a category field 310, an action field 320, a TFS ID number field 330, and a TFS ID list field 340. The category field 310 is used to indicate the category of the TFS notification frame 300 and can be set to a value indicating a wireless network management category. The action field 320 is used to identify the type of the frame and can be set to a value indicating the TFS notification frame. The TFS ID number field 330 is set to a value indicating the number of TFS IDs in the TFS ID list field 340. The TFS ID list field 340 indicates a list of traffic filter sets including the matched TCLAS information elements.

In this embodiment, the non-AP STA may cancel or change the set traffic filters. For example, after predetermined traffic filters are set by steps S41 and S42, the non-AP STA can transmit the TFS request frame not including a specific TFS element, whereby it can be indicated that the relevant traffic filter, that is, the relevant TFS element, is not used any more. In this case, the AP having received the TFS request frame not including the TFS element corresponding to the set traffic filter can transmit the TFS response frame in which the state field of the response element is set to "Accept" in response to the TFS request frame. In this embodiment, the non-AP STA may transmit the TFS request frame not including the TFS element, thereby ending the use of the TFS. The AP having received the TFS request frame not including the TFS element cancels all the traffic filters.

According to the embodiment of the invention, plural TFS request element can be included in one TFS request frame. That is, one TFS request frame can include plural TFS IDs. Accordingly, even when a non-AP STA intending to use the TFS transmits the TFS request frame only once, the non-AP STA can define plural traffic filters to be set. In the wireless network management procedure according to the aspects of the invention, it is possible to enhance the efficiency in using radio resources in the TFS procedure and the requesting non-AP STA need not transmit the TFS request frame plural times even when the number of sets of traffic filters to be set is two or more.

A traffic filter service procedure according to a second embodiment of the invention will be described now. This embodiment is similar to the first embodiment, in that the TFS request message includes one or more TFS request elements. However, the second embodiment is different from the first embodiment, in that filter interval information is included in the TFS request message. The difference from the first embodiment will be mainly described in brief.

In this embodiment, the non-AP STA intending to use the TFS first transmits a TFS request frame or a re-association request frame to the AP as the TFS provider. FIG. 11 is a diagram illustrating a format of a TFS request frame that can be used in this embodiment. Referring to FIG. 11, the TFS request frame 400 includes a category field 410, an action field 420, a dialog token field 430, a filter interval field 440, and a TFS request element field 450, and a vendor specific element field 460. That is, the TFS request frame 400 according to this embodiment is different from the TFS request frame 100 shown in FIG. 4, in that it further includes the filter interval field 440.

The filter interval field 440 serves to show the minimum interval at which a frame for notifying the fact that a frame matched with the set traffic filter has been received, for example, the TFS notification frame, is transmitted. Here, the title of "filter interval" is arbitrary, and other titles such as "delivery timeout" and "filter timeout" may be used. However, regardless of the titles, the function of the field is constant. That is, when the TFS notification frame for notifying that the frame matched with a specific traffic filter is received is first transmitted and then a frame matched with the same traffic filter (that is, the traffic filter having the same TFS ID) or another traffic filter is received, the filter interval field 440 performs a function of indicating the minimum time interval at which the TFS notification frame can be transmitted. The unit of the filter interval is TU (Time Unit).

For example, when the filter interval field 440 is set to "0", the minimum value of the filter interval is 0. Accordingly, when frames matched with the set traffic filter is continuously received, the AP transmits the TFS notification frame to the STA as soon as receiving the frames.

Alternatively, it is assumed that the filter interval field 440 is set to a predetermined value, for example, "10", other than 0. Then, before 10 TU passes after the AP transmits a first TFS notification frame to the STA, it is assumed that one or more frames matched with the same or other traffic filter are additionally received. In this case, the AP cannot transmit a second TFS notification frame as soon as receiving the frame and transmits the second TFS notification message in 10 TU in minimum after transmitting the first TFS notification message. In some embodiments, the information indicating the number of matched traffic filters may be transmitted together during the time of 10 TU. This will be described later.

In this way, when plural frames matched with the traffic filters are received for a predetermined time, the filter interval field 440 can prevent the TFS notification frame from being repeatedly transmitted from the AP to the STA for a short time, by allowing the AP to transmit a frame indicating that the frame is received at a constant time interval. Accordingly, in this embodiment, it is possible to enhance the efficiency in using the radio resources by preventing the repeated transmission of the same frame. In this embodiment, it is also possible to prevent an ill-intentioned STA from allowing a specific STA to smoothly use the wireless network service by continuously transmitting data to a specific STA.

This embodiment is useful for the case where a specific STA is in a power saving mode. When a STA is in a dormant state of the power saving mode, it is preferable that the number of received frames is minimized. That is, in this embodiment, since the TFS notification frame is received at the time interval set in the delivery interval field 440, it is possible to further reduce the power consumption resulting from the frequent awaking of the STA in the dormant state for receiving the TFS notification frame.

Figure 12:
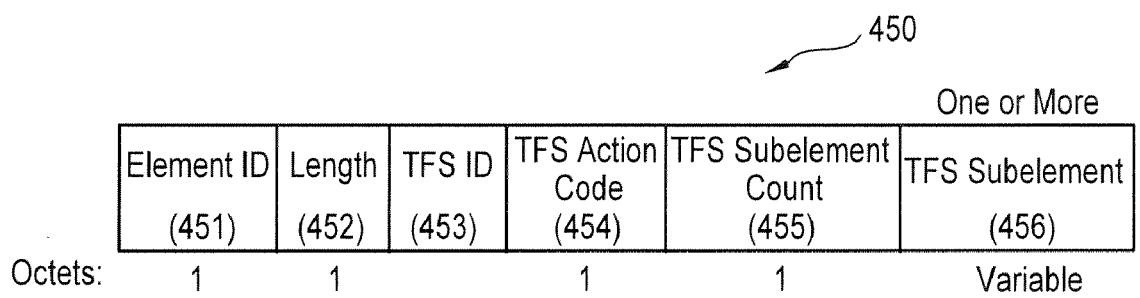
FIG. 12 is a diagram illustrating a format of a TFS request element field of the TFS request frame shown in FIG. 11.

FIG. 12 is a diagram illustrating a format of the TFS request element field 450. Referring to FIG. 12, the TFS request element field 450 includes an element ID subfield 451, a length subfield 452, a TFS ID subfield 453, a TFS action code subfield 454, a TFS sub-element count subfield 455, and one or more TFS sub-element subfields 456. The TFS request element field 450 in this embodiment is different from the TFS request element field 140 shown in FIG. 5, in that it further includes the TFS sub-element count subfield 455. The TFS sub-element count subfield 455 includes information indicating the number of TFS sub-element subfields 456 in the TFS request element field 450.

Since the procedure after the non-AP STA transmits the TFS request frame to the AP is similar to that of the first embodiment, detailed description thereof is omitted. However, in this embodiment, when the non-AP STA transmits to the AP the TFS request frame 400 including one or more TFS sub-elements and the "filter interval" set to a predetermined value and the AP returns to the non-AP STA the TFS response frame including the information indicating the acceptance in response to the TFS request frame 400, the AP starts providing the TFS. Accordingly, when a frame matched with the later-set traffic filter is received, the AP transmits to the requesting STA the received frame or a particular frame (for example, TFS notification frame) indicating that the frame is received. The AP transmits the TFS notification frame to the requesting STA, for example, when the bit of "Notify" in the TFS action code field of the TFS request frame 400 is set to "1." When frames matched with the traffic filter are continuously received, the AP does not continuously transmit the "TFS notification frame", but transmits a first TFS notification frame and then transmits a second TFS notification frame after a time corresponding to the value set in the "filter interval" field passes. The second TFS notification frame can further include information indicating the ID of the matched traffic filter and the number of matched traffic filters. Details thereof will be described now with reference to FIG. 13.

Figure 13:
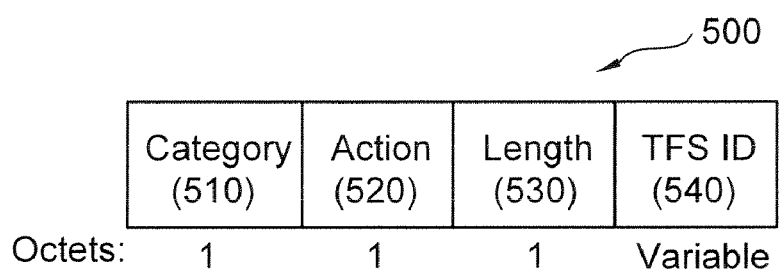
FIG. 13 is a diagram illustrating a format of a TFS notification frame according to the second embodiment of the invention.

FIG. 13 is a diagram illustrating a format of the TFS notification frame according to an embodiment of the invention. Referring to FIG. 13, the TFS notification frame 500 includes a category field 510, an action field 520, a length field 530, and a TFS ID field 540. The category field 510 is used to indicate the category of the TFS notification frame 500 and can be set to a value indicating a wireless network management category. The action field 520 is used to identify the type of the frame and can be set to a value indicating the TFS notification frame. The length field 530 includes information indicating the number of matched traffic filters, when the frames match with one or more traffic filters are received during the "filter interval" set to the value included in the received TFS request frame. The TFS ID field 540 indicates the traffic filter set including the matched TCLAS information elements and includes one or more TFS IDs depending on the value set in the length field 530.

According to the above-mentioned embodiments, when the traffic filters for the TFS are set, the information indicating that delivery interval at which the STA transmits the TFS notification message to the AP is included. Accordingly, in the delivery interval, the AP does not transmit the TFS notification frame to the STA every time, even when the frame matched with the set traffic filter is received plural times. According to the embodiments, after the delivery interval set along with the traffic filters passes, the TFS notification frame including the information indicating the number of matched traffic filters is transmitted to the STA.

The embodiments described above in detail are only examples explaining the technical spirit of the invention and it should be understood that the technical spirit is not limited to the embodiments. The scope of the invention is defined by the appended claims.

What is claimed:

1. A wireless apparatus for a traffic filter service (TFS) in a wireless local area network, the wireless apparatus comprising:
   a transceiver configured to transmit and receive a radio signal; and
   a processor operably coupled to the transceiver and configured to:
      transmit a first TFS request message to an access point (AP), the first TFS request message including a TFS request element for defining information about requesting traffic filters;
      receive a first TFS response message from the AP in response to the first TFS request message, the first TFS response message including a TFS response element for defining information about a status of the requesting traffic filters; and
      receive a TFS notification frame from the AP when a frame received by the AP matches a matched traffic filter of the requesting traffic filters and a 'Notify' bit-field of the TFS request element is set to 1,
   wherein the TFS request element includes one or more TFS sub-element fields, a TFS ID field and a TFS action code field, the one or more TFS sub-element fields specifying the requesting traffic filters, the TFS ID field indicating a unique ID for the requesting traffic filters, the TFS action code field defining actions taken at the AP when the frame matches the matched traffic filter,
   wherein the TFS action code field includes a 'Delete' bit-field and the 'Notify' bit-field, the 'Delete' bit-field indicating whether the matched traffic filter is to be deleted when the frame matches the matched traffic filter, the 'Notify' bit-field indicating whether a TFS notification frame is to be sent when the frame matches the matched traffic filter,
   wherein the TFS response element includes one or more TFS status sub-element fields for defining information about the status of the requesting traffic filters, and
   wherein the TFS notification frame includes a TFS ID number field and a TFS ID list field, the TFS ID number field indicating a total number of TFS IDs in the TFS ID list field, the TFS ID list field indicating the matched traffic filter.

2. The wireless apparatus of claim 1, wherein each of the one or more TFS status sub-element fields includes a TFS response status field and the TFS ID field, the TFS response status field indicating the status returned by the AP.

3. The wireless apparatus of claim 1, wherein:
the first TFS request message is a TFS request frame; and
the first TFS response message is a TFS response frame.

4. The wireless apparatus of claim 1, wherein:
the first TFS request message is a re-association request frame; and
the first TFS response message is a re-association response frame.

5. The wireless apparatus of claim 1, wherein the processor is further configured to:
transmit, to the AP, a second TFS request message without a particular TFS request element in order to indicate that the matched traffic filter is no longer used; and
receive, from the AP in response to the second TFS request message, a second TFS response message with a response element status field value set to 'Accept'.

6. The wireless apparatus of claim 1, wherein the processor is further configured to transmit, to the AP, a second TFS request message with no TFS request element in order to cancel all of the requesting traffic filters at the AP.

7. A wireless apparatus for a traffic filter service (TFS) in a wireless local area network, the wireless apparatus comprising:
a transceiver configured to transmit and receive a radio signal; and
a processor operably coupled to the transceiver and configured to:
receive a first TFS request message from a non-access point (AP) station, the first TFS request message including a TFS request element for defining information about requested traffic filters;
transmit a first TFS response message to the non-AP station in response to the first TFS request message, the first TFS response message including a TFS response element for defining information about a status of the requested traffic filters; and
transmit a TFS notification frame to the non-AP station when a frame received by the wireless apparatus matches a matched traffic filter of the requested traffic filters and a 'Notify' bit-field of the TFS request element is set to 1,
wherein the TFS request element includes one or more TFS sub-element fields and a TFS ID field, the one or more TFS sub-element fields specifying the requested traffic filters, the TFS ID field indicating a unique ID for the requested traffic filters,
wherein the TFS response element includes one or more TFS status sub-element fields for defining information about the status of the requested traffic filters, and
wherein the TFS notification frame includes a TFS ID number field and a TFS ID list field, the TFS ID number field indicating a total number of TFS IDs in the TFS ID list field, the TFS ID list field indicating the matched traffic filter.

8. The wireless apparatus of claim 7, wherein the TFS request element further includes a TFS action code field for defining actions taken at the wireless apparatus when the frame matches the matched traffic filter.

9. The wireless apparatus of claim 7, wherein the processor is further configured to:
receive a second TFS request message without a particular TFS request element from the non-AP station;
transmit a second TFS response message to the non-AP station in response to the second TFS request message with a response element status field value set to 'Accept'; and
cancel the matched traffic filter.

10. The wireless apparatus of claim 7, wherein the processor is further configured to:
receive a second TFS request message with no TFS request element from the non-AP station; and
cancel the requested traffic filters for the non-AP station.

* * * * *